June 20, 1972   A. E. WILLIAMS   3,671,393
NUCLEAR REACTOR FUEL ELEMENTS

Filed Aug. 11, 1969

United States Patent Office 3,671,393
Patented June 20, 1972

3,671,393
NUCLEAR REACTOR FUEL ELEMENTS
Albert Etheridge Williams, Blackpool, England, assignor to United Kingdom Atomic Energy Authority, London, England
Filed Aug. 11, 1969, Ser. No. 848,788
Claims priority, application Great Britain, Aug. 29, 1968, 41,344/68
Int. Cl. G21c 3/18
U.S. Cl. 176—73
4 Claims

ABSTRACT OF THE DISCLOSURE

A nuclear reactor fuel element comprises nuclear fuel material enclosed in a protective sheath, a number of spacer members being provided in the sheath dividing the fuel material into longitudinal segments. The ends of the spacer members are longitudinally crushable enabling the fuel segments to expand in the longitudinal direction of the sheath to avoid swelling of the sheath by radial expansion of the fuel segments.

BACKGROUND OF THE INVENTION

This invention relates to nuclear fuel elements of the kind comprising ceramic nuclear fuel enclosed in a protective sheath.

In such fuel elements a protective sheath is required which is sufficiently strong to withstand the internal stresses imposed on it by the thermal expansion and swelling of the fuel when a fuel element is irradiated in a nuclear reactor. The sheath thus resists distortion and failure and prevents fission products from entering the reactor coolant.

The strength of the sheath is normally related to its thickness, but as the sheath is parasitic of neutrons and is also a main item in the cost of fuel elements, it is therefore desirable that it be as thin as possible and at the same time be capable of resisting the internal stresses imposed on it by the fuel during irradiation. Normally the design of a fuel element makes provision for accommodating the fuel swelling and expansion within the sheath in such a way that the sheathing is not subjected to any undue strains. A known manner of achieving this involves the use of low density or hollow ceramic fuel bodies to provide a fuel member having internal voidage which can accommodate radial expansion and swelling of the fuel and also provides a volume of free space in the fuel elements for accommodation of gaseous fission products generated in the fuel.

However, in nuclear reactors operating at high power levels the amount of fuel swelling and gaseous fission product release in a fuel element is such that even with the use of fuel bodies which provide voidage within the fuel elements, radial straining of the sheath can still occur. As a further expedient to avoid radial straining of the sheath, allowance can be made for longitudinal expansion of the fuel material in the sheath.

For example if fuel pellets are housed in a column within the protective sheath, allowance for longitudinal expansion of the column of fuel pellets can be made in a simple manner by providing a space in the sheath at one end of the column of fuel pellets. Since the clearance between the sheath and the outer surface of the column of fuel pellets is made a minimum to provide maximum heat transfer through the sheath, a probability exists that one or more of the pellets may jam in the sheath rather than expand or move longitudinally in the sheath. The portion of the column of fuel pellets which is then restricted in longitudinal extension by the jammed pellet or pellets can only expand radially with consequent radial straining of the fuel element sheath. To avoid this difficulty it has been proposed to provide a number of spacer members in a fuel element sheath dividing the column of fuel pellets into longitudinal segments. The spacer members are fixed in the fuel element sheath and are positioned so that a space exists at one end of each of said segments of pellets to allow each segment to expand longitudinally relative to the sheath. A problem arises in manufacture of such a fuel element in that it is difficult to position the spacer members accurately in the sheath so as to provide the spaces required for longitudinal expansion of the segments of fuel pellets.

The division of the fuel into longitudinal segments by fixed spacer members is also desirable when the fuel is of low density or in the form of hollow bodies intended for accommodation of radial swelling. If the fuel element is subjected to very high temperatures during, for example, an inadvertent power excursion of the reactor, fuel melting can occur. Unless the fuel is divided into unit lengths, as by fixed spacers in the sheath, slumping of fuel to the lower end of a vertically arranged fuel element can occur giving rise to reactor instability.

SUMMARY OF THE INVENTION

According to the present invention a nuclear reactor fuel element comprises nuclear fuel material enclosed in a protective sheath, a plurality of spacing members dividing the fuel material into longitudinal segments in the sheath, one end at least of each spacer member being formed so as to have a low resistance to longitudinal crushing enabling said segments to expand in the longitudinal direction of the sheath by crushing of the corresponding ends of the spacer members.

Preferably the spacer members are fixed against longitudinal movement in the fuel element sheath, for example by being brazed inside the sheath or by crimping of the sheath into engagement with locking grooves around the spacer members.

One form of spacer member according to the invention comprises a tubular body fitting inside the fuel element sheath at least one end of the body being formed with thin walled extensions of petal shape which are domed over to form a crushable hemispherical end on the body.

Another form of spacer member, in accordance with the invention, comprises a tubular body fitting inside the fuel element sheath at least one end of the body being formed with longitudinally extending fingers which are also spaced radially from the internal bore of the sheath when the spacer member is fitted in the sheath.

DESCRIPTION OF THE DRAWING

Embodiments of the invention will now be described with reference to the accompanying drawings in which.

DESCRIPTION OF THE PREFERRED EMBODIMENT

Figure 1:
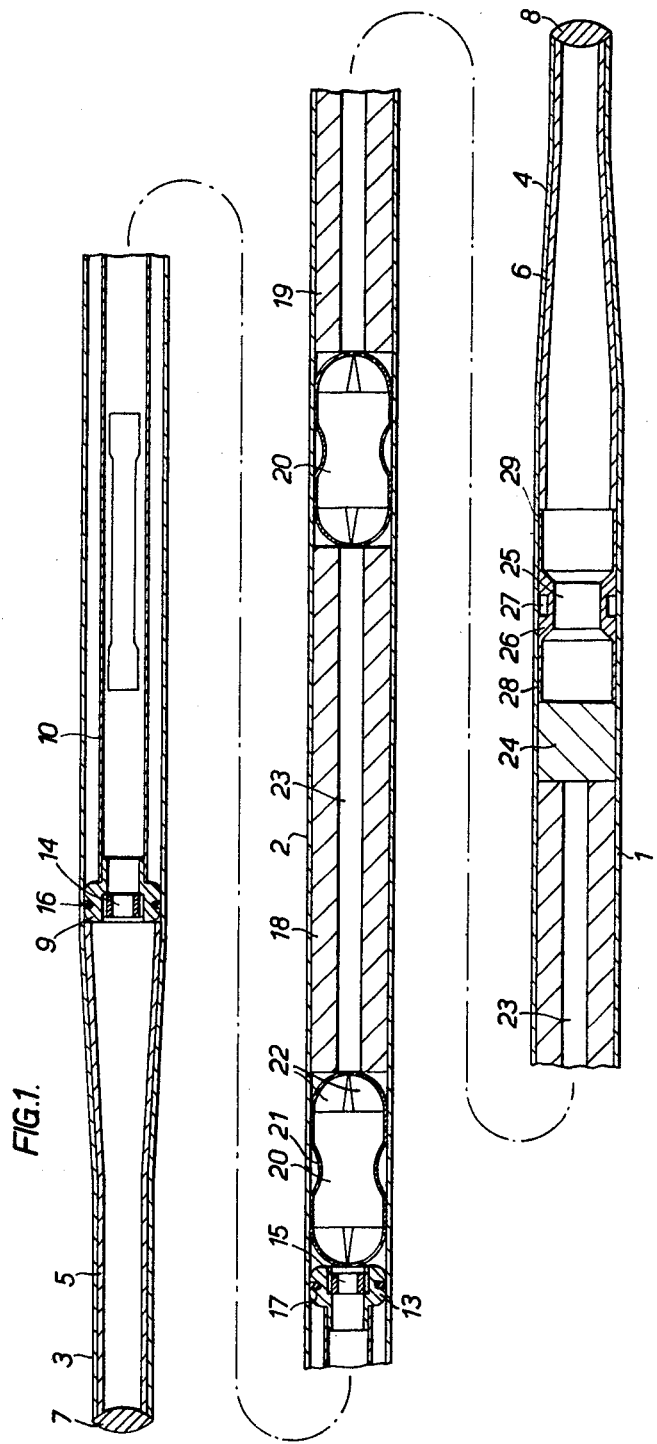
FIG. 1 is a longitudinal sectional view of a fuel element incorporating spacer members according to the invention.

Referring to FIG. 1, a helium filled nuclear reactor fuel element 1, suitable for use in a liquid metal cooled nuclear reactor, comprises a stainless steel tubular protective sheath 2, having end sections 3 and 4 of reduced diameter compared with the central section of the sheath 2. The end sections 3 and 4 are fitted with stainless steel inner sleeves 5 and 6 respectively and are sealed with end welds 7 and 8. Bearing against the end of the inner sleeve 5, remote from the end weld 7, is a spigot member 9 fitted at one end of a tubular strut 10. A spigot member 13 is fitted at the other end of the strut 10. The members 9 and 13 are sealed by means of plugs 14 and 15, and are provided with circlips 16 and 17 which locate the strut 10 within the sheath 2.

The sheath 2 contains nuclear fuel material in the form of a column of annular fuel pellets 18, for example of a uranium dioxide/plutonium dioxide mixture. The column of fuel pellets 18 is divided into a number of longitudinal segments 19 by tubular spacer members 20. Each spacer member 20 is of stainless steel and is fabricated from sheet or tube of the same thickness as the protective sheath 2. Each spacer member 20 has a central circumferential recess 21 which provides accommodation for braze metal employed to fix the spacer member 20 in position within the protective sheath 2. Each end of every spacer member 20 is extended to form three or four thin walled petals 22 which are domed inwards to provide the spacer members 20 with crushable hemispherical ends. The tips of the petals 22 meet at the apex of the hemispherical ends of the spacer member 20. A spacer member 20 is also provided between the spigot member 13 and the adjacent end of the column of fuel pellets 18. The fuel pellets 18 being of annular form provide a central longitudinal void 23 in the fuel element.

The other end of the column of fuel pellets 18, remote from the strut 10, is in abutment with a tungsten or molybdenum knit mesh pellet 24 which is spaced apart from the inner sleeve 6 of end section 4 by a stainless steel spacer member 25. The spacer member 25 comprises a thick walled central portion 26 having a circumferential groove 27 into which the protective sheath 2 is crimped. The spacer member 25 has thin walled cylindrical end extensions 28 and 29, the cylindrical extension 28 bearing against the knit mesh pellet 24 and the cylindrical extension 29 bearing against the inner sleeve 6.

Figure 2:
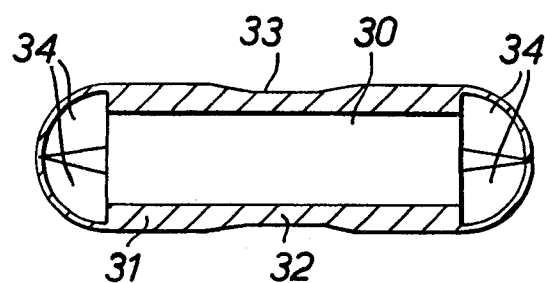
FIG. 2 is a longitudinal sectional view of an alternative form of spacer member.
Figure 3:
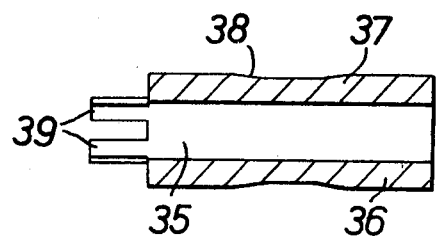
FIG. 3 is a longitudinal sectional view of another form of spacer member.

FIGS. 2 and 3 show alternative forms of collapsible spacer members that may be used in place of those shown in FIG. 1.

FIG. 2 shows a stainless steel spacer member 30 having a thick walled tubular body 31, with a central portion 32 of reduced thickness, providing a circumferential depression 33 around the body 31 into which the fuel element sheath 2 is mechanically crimped. Each end of the body 31 has four thin walled petals 34 which are domed inwards to provide the spacer member 30 with crushable hemispherical ends. FIG. 3 shows a collapsible spacer member 35 having a thick walled tubular body 36 with a central portion 37 of reduced thickness providing a circumferential depression 38 around the body 36 into which the fuel element sheath 2 is mechanically crimped. One end of the body 36 has four equally spaced longitudinally projecting fingers 39 which are of thin cross section. The fingers 39 are formed by external reduction of the wall thickness of one end of the spacer body 36 and then by longitudinal slotting of the thin walled tubular end portion thus formed. Therefore when the spacer 35 is fitted in a fuel element sheath the fingers 39 are spaced radially from the internal bore of the sheath.

In the arrangement of FIG. 1 the fuel pellets 18 in each of the segments 19 can expand longitudinally relative to the sheath 2 by crushing of the hemispherical domed ends of the spacer members 20. This is also the case in a fuel element employing spacer members 30 as shown in FIG. 2. In the case of a fuel element using spacer member 35 as shown in FIG. 3, longitudinal expansion of the fuel material in the segments 19 is accommodated by crushing of the fingers 39 of the spacer member 35.

The domed ends of the spacer members 20 and 30 or the fingers 39 of spacer members 35 are sufficiently strong to withstand distortion during loading of fuel into the fuel element sheath 2 during manufacture. Fuel loading merely involves insertion of fuel and spacers end to end into the fuel element sheath.

I claim:

1. A nuclear reactor fuel element comprising nuclear fuel material enclosed in a protective sheath, a plurality of spacer members dividing the fuel material into longitudinal segments in the sheath, one end at least of each spacer member having longitudinally permanently deformable extensions whereby said segments are enabled to expand in the longitudinal direction of the sheath by deformation of the extensions at the ends of the spacer members.

2. A nuclear reactor fuel element as claimed in claim 1 wherein the spacer members are fixed longitudinally with respect to the fuel element sheath.

3. A nuclear reactor fuel element as claimed in claim 1 wherein each spacer member comprises a tubular member fitting inside the fuel element sheath, at least one end of the tubular body having thin walled domed extensions of petal shape defining a crushable hemispherical end of the tubular body.

4. A nuclear reactor fuel element as claimed in claim 1 wherein the fuel element sheath has an internal bore and each spacer member comprises a tubular body fitting inside the internal bore of the sheath, at least one end of the tubular body having longitudinally extending fingers, a clearance being defined between the fingers and the internal bore of the sheath with the spacer member fitted in the sheath.

References Cited

UNITED STATES PATENTS

| 3,053,743 | 9/1962 | Cain | 176—79 X |
|---|---|---|---|
| 3,145,149 | 8/1964 | Imhoff | 176—68 X |
| 3,180,804 | 4/1965 | Flora et al. | 176—79 |
| 3,189,101 | 6/1965 | Blake | 176—79 X |
| 3,197,381 | 7/1965 | Blake | 176—79 X |
| 3,225,437 | 12/1965 | Stohr et al. | 176—79 X |
| 3,274,067 | 9/1966 | Greebler et al. | 176—68 |
| 3,239,426 | 3/1966 | Waine et al. | 176—79 X |
| 3,291,699 | 12/1966 | Trickett et al. | 176—68 |
| 3,466,226 | 9/1969 | Lass | 176—79 X |

BENJAMIN R. PADGETT, Primary Examiner

G. G. SOLYST, Assistant Examiner

U.S. Cl. X.R.

176—68